United States Patent [19]

Koizumi et al.

[11] Patent Number: 4,522,254

[45] Date of Patent: Jun. 11, 1985

[54] HEAT STORAGE TROUGH

[75] Inventors: Hajime Koizumi; Shumpei Ohara, both of Tokyo; Kiyoshi Kouda, Funabashi; Muneshige Nagatomo; Noriyasu Sagara, both of Tokyo; Satoshi Togari, Tama; Hiroo Izumiyama, Kodaira, all of Japan

[73] Assignee: Kajima Kensetsu Kabuhiki Kaisha, Tokyo, Japan

[21] Appl. No.: 419,958

[22] Filed: Sep. 20, 1982

[30] Foreign Application Priority Data

Sep. 30, 1981 [JP] Japan .................................. 56-156004

[51] Int. Cl.³ ............................ F24J 3/02; F28D 21/00
[52] U.S. Cl. ....................................... 165/34; 126/419; 126/422; 126/437; 137/592; 165/104.19; 165/40
[58] Field of Search ....................... 165/104.19, 40, 34; 126/437, 422; 137/590, 592

[56] References Cited

U.S. PATENT DOCUMENTS

| 4,137,900 | 2/1979 | Brautigam | 126/437 |
| 4,413,614 | 11/1983 | Lyon et al. | 126/437 |
| 4,436,058 | 3/1984 | McAllister | 126/437 |

FOREIGN PATENT DOCUMENTS

| 2405443 | 6/1979 | France | 126/437 |
| 49 | 1/1977 | Japan | 165/104.19 |
| 2937 | 1/1978 | Japan | 165/104.19 |
| 113542 | 9/1979 | Japan | 126/437 |

Primary Examiner—Albert W. Davis, Jr.
Attorney, Agent, or Firm—Pearne, Gordon, Sessions, McCoy, Granger & Tilberry

[57] ABSTRACT

A heat transfer fluid storage device is provided, including a tank and one or more vertical chambers open at top and bottom and spaced from the top and bottom of the tank to define upper and lower liquid storage areas. Means are provided to extract liquid from either the lower storage area or the upper storage area, or both, deliver the liquid to heat exchanger means and then return the liquid to either the lower or the upper storage area, or both.

12 Claims, 6 Drawing Figures

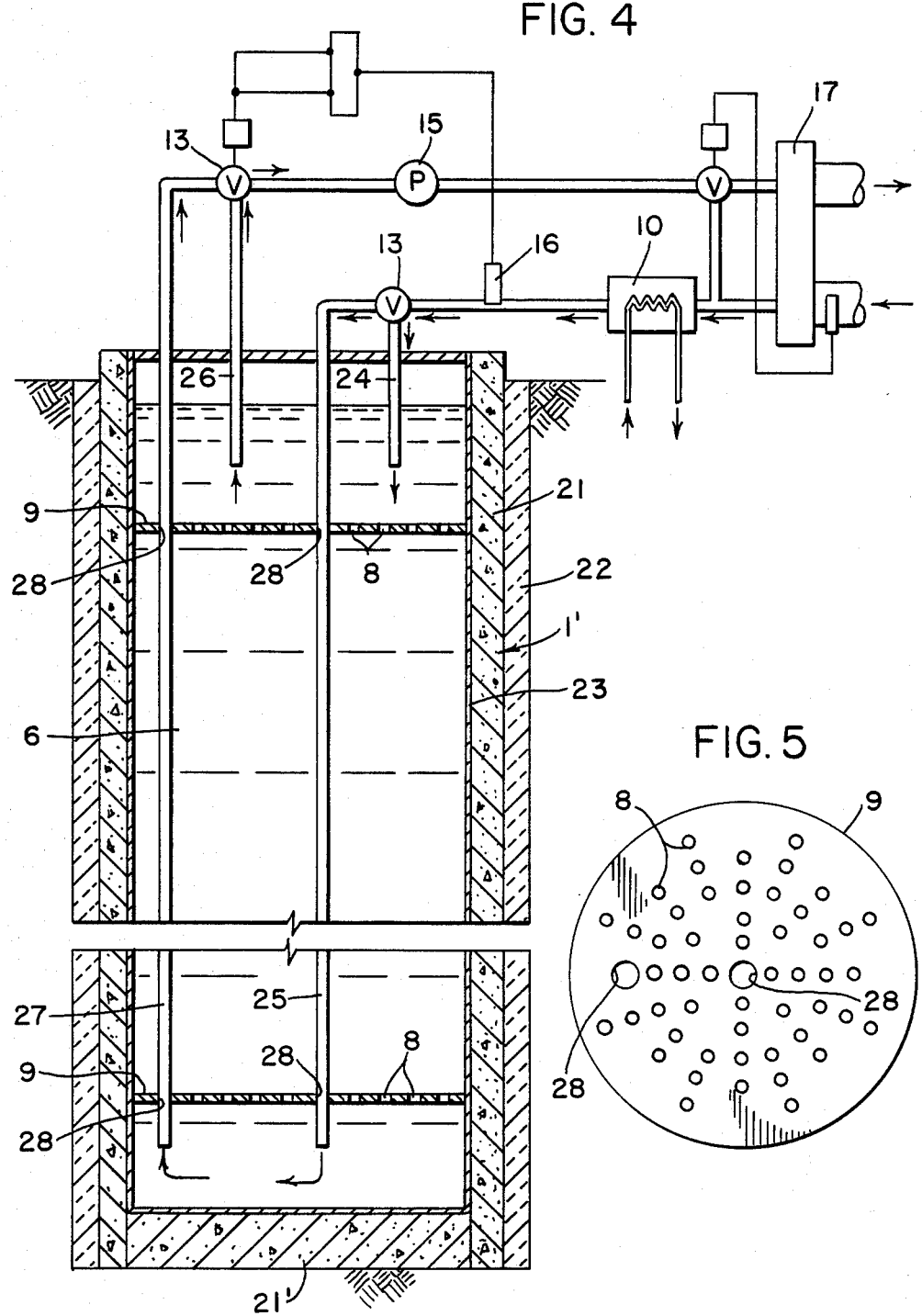

HEAT STORAGE TROUGH

BACKGROUND OF THE INVENTION

1. Field of the Invention

This invention relates to a heat storage device for storing a heat transfer medium such as water for air conditioning.

2. Description of the Prior Art

Recently, heat storage apparatus provided with a heat storage tank for storing a heat transfer medium such as warm water for room heating or cold water for room cooling, have been extensively used. The heat storage tank is effective for storing heat transfer medium for air conditioning and leveling power load. However, in the heat storage tank the heat transfer medium is diffused, so that it is difficult to form a constant temperature layer and high heat loss is liable.

More particularly, in prior art heat storage devices such as shown in FIG. 1, water 2 which serves as heat transfer medium is stored in heat storage tank 1, and cold water approximately at 9° C. led from a primary heat exchanger through a duct line 3 to be discharged in a bottom portion of a tank. When desired, cold water at about 9° C. is taken out from the bottom portion of the tank through the duct line 3 for heat exchange in a secondary heat exchanger for room cooling. In such a heat storage tank, however, water flows obliquely so that it is difficult to form a constant temperature layer. Further, a large dead water zone of water is formed which can hardly flow. Therefore, the cold water storage efficiency is low, and cold water cannot be sufficiently taken out when required by the secondary heat exchanger.

Further, in order to minimize loss due to diffusion, it is necessary to increase the ratio of the depth to the width of the tank. However, even if the depth-to-width ratio is increased, diffusion of heat transfer medium occurs, depending upon the flow of heat transfer medium into and out of the tank. Therefore, the constant temperature layer is liable to be disturbed so that it is not so easy to maintain the temperature of this layer.

SUMMARY OF THE INVENTION

According to the present invention, there is provided a heat storage tank in which an excellent constant temperature layer can be formed by stored heat transfer medium, which can store a large quantity of heat within a small volume and which has high heat storage and heat dissipation efficiencies. In the heat storage tank, a vertically elongate cell for storing heat transfer medium is defined by perforated plates disposed near the top and bottom of the tank.

OBJECTS OF THE INVENTION

An object of the present invention is to provide a heat storage tank in which an excellent constant temperature layer of heat transfer medium is formed, which has a high heat storage efficiency and which can store a great quantity of heat for room heating and room cooling within a small volume.

Another object of the present invention is to provide a heat storage tank, with which the temperature of heat transfer medium supplied to a primary heat exchanger or to a secondary heat exchanger can be properly controlled, thus improving the heat storage efficiency and heat dissipation efficiency.

A further object of the present invention is to provide a heat storage tank which permits improving the heat storage efficiency by having a greater height dimension than the lateral dimension by partitioning the interior of the tank into a plurality of vertically elongate cells.

The above-mentioned and other objects, features and advantages of the heat storage tank according to the present invention will become apparent from the following detailed description taken in conjunction with the drawings which indicate preferred embodiments of the present invention.

BRIEF DESCRIPTION OF THE DRAWINGS

FIG. 4 is an elevational view in section showing an embodiment of the heat storage device having a single vertically elongate tank cell according to the invention together with a showing of a desirous piping for air conditioning; and, FIG. 5 is a plan view showing a perforated plate used in accordance with the present invention.

Throughout the drawings, like reference numerals designate the same or equivalent elements constituting the heat storage device according to the present invention.

DESCRIPTION OF THE PREFERRED EMBODIMENTS

Some preferred embodiments of the present invention will now be described, but it is to be understood that these embodiments have been chosen for illustrative purposes only, the range of the invention being limited only by the scope of the appended claims.

Figure 1:
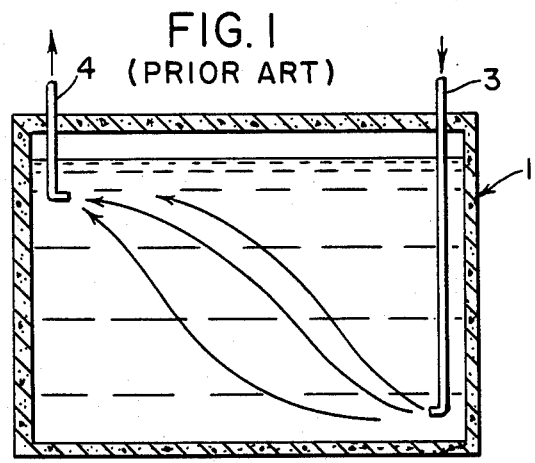
FIG. 1 is an elevational view in section showing a prior art storage device.
Figure 2A:
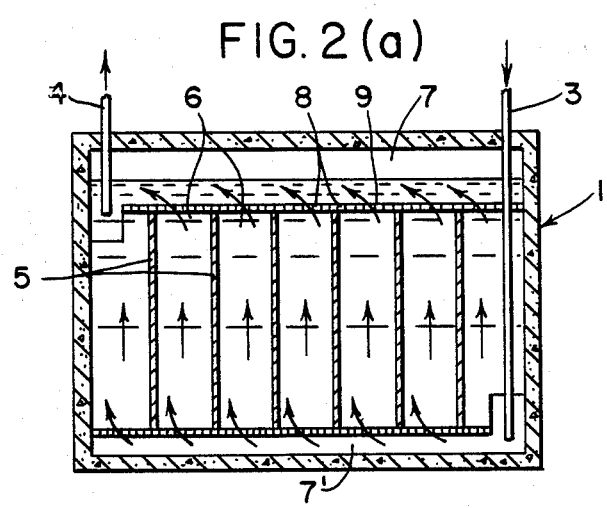
FIGS. 2(a) and 2(b) are respectively an elevational view in section and a top plan view showing a heat storage device according to the present invention, in which the interior of a tank is partitioned into a plurality of vertically elongate cells by vertical partition members.
Figure 2B:
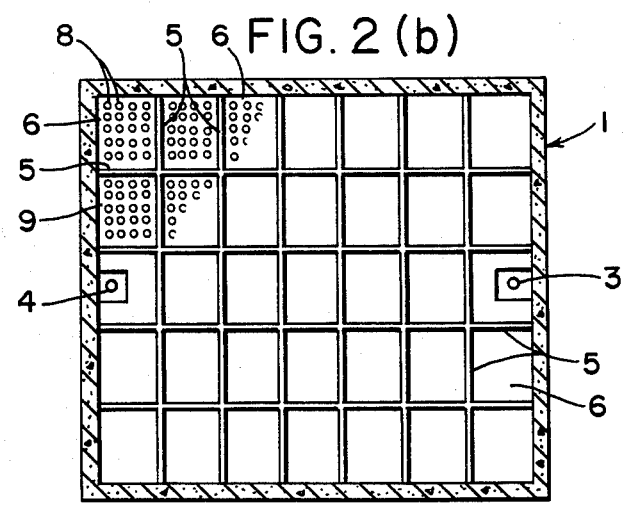

Referring to FIG. 2, in the tank 1 of a heat storage device, vertical partition members 5 are disposed to extend in two perpendicular directions. These partition members define a plurality of vertically elongate cells 6 having a rectangular sectional shape. The partition members 5 reach neither the top nor the bottom of the tank 1, so that communicating sections 7 and 7' are formed in the upper and lower portions of the interior of the tank. Horizontal perforated plates 9, see FIG. 3, having a number of holes or openings 8, are disposed at the upper and lower ends of the partition members 5. These perforated plates partition the cells 6 with respect to the upper and lower communicating sections 7 and 7' and provide communication through the cells and sections via the holes 8. Duct lines 3 and 4 are open to the communicating sections 7' and 7 respectively.

With the above construction, at the time of room cooling, cold water supplied from a primary heat exchanger is led through the duct line 3 to the lower communicating section 7' in the trough and thence rise through the plurality of cells 6. At the time of room heating, water is led through the duct line 3 to a secondary heat exchanger to absorb heat and is then returned to the tank through the duct line 4. At this time, the cold water in the tank flows in horizontal directions in the upper and lower communicating sections 7 and 7′, but flows through the cells 6 just like it was pushed forth in vertical directions. Besides, the upper and lower ends of the cells are partitioned by the perforated plates 9. Thus, the effects of the flow of water in the upper and lower communicating sections 7 and 7′ in the horizontal directions on the water in the cells 6 can be reduced to provide uniform flow of water ascending or descending through the cells 6. Thus, it is possible to obtain an improved constant temperature layer in the cells.

Figure 3:
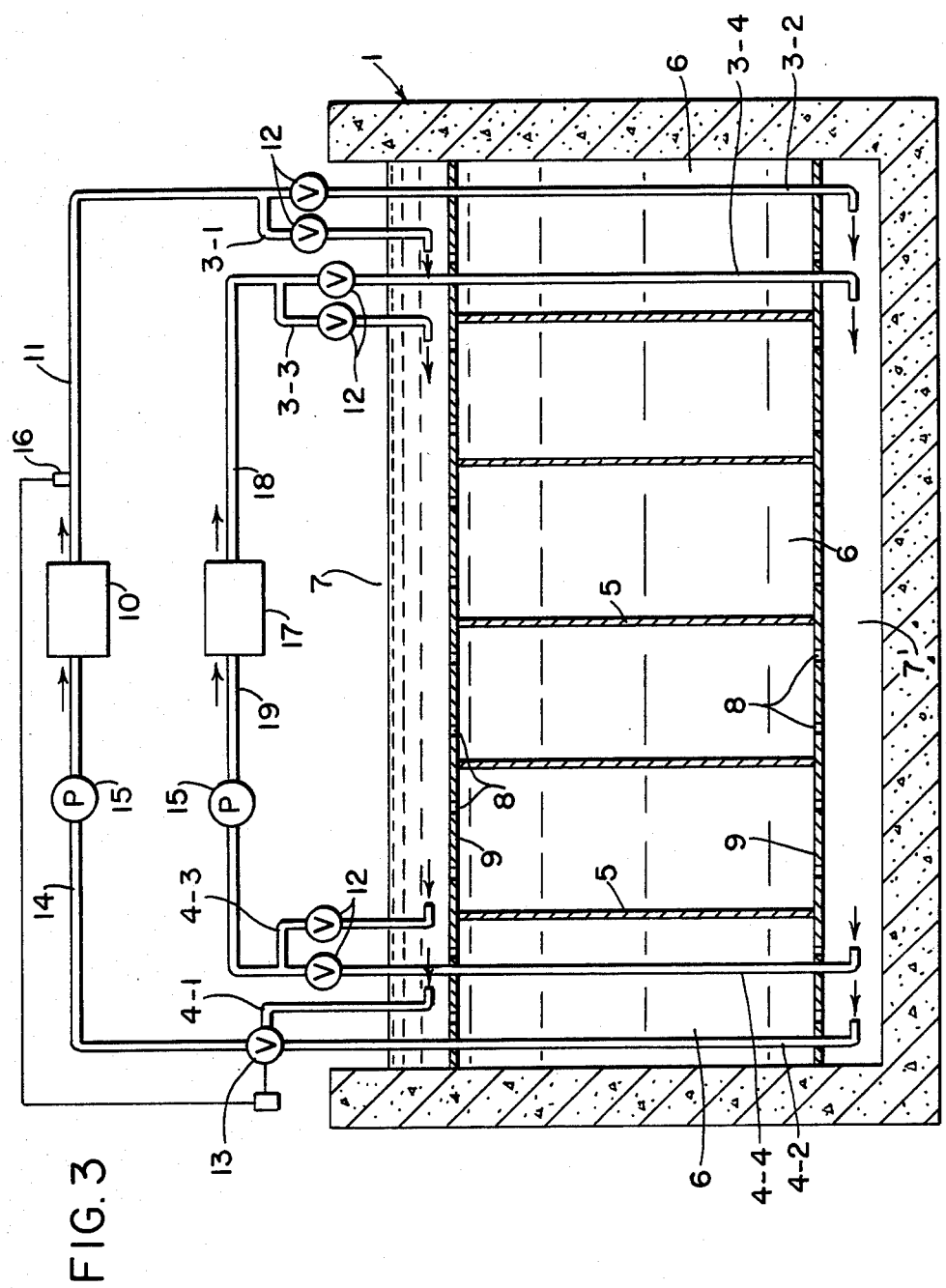
FIG. 3 is an elevational view in section showing one embodiment of the heat storge device having a plurality of tank cells according to the present invention together with a showing of preferred piping for air conditioning.

FIG. 3 shows an embodiment of the heat storage device provided with a piping for air conditioning according to the present invention.

In the heat storage tank 1, upper primary side discharge and suction port ducts 3-1 and 4-1 are open to the communicating section 7, and lower primary side discharge and suction port ducts 3-2 and 4-2 are open to the lower communicating section 7′. The discharge port ducts 3-1 and 3-2 branch from a discharge duct 11 leading from a primary heat exchanger 10, and are provided with respective valves 12. The suction port ducts 4-1 and 4-2 are joined by a three-way valve 13 to a suction duct 14 leading to the primary heat exchanger 10. A pump 15 is inserted in suction duct 14, and a temperature sensor 16 is inserted into the discharge duct 11. In the heat storage tank 1, upper secondary side discharge and suction port ducts 3-3 and 4-3 are open to the upper communicating section 7, and lower secondary side discharge and suction port ducts 3-4 and 4-4 are open to the lower communicating section 7′. The discharge port ducts 3-3 and 3-4 branch from a discharge duct 18 led from a secondary heat exchanger 17, and are provided with respective valves 12. The suction port ducts 4-3 and 4-4 are provided with respective valves 12, and join a suction duct 19 leading to the secondary heat exchanger 17. The suction duct 19 is also provided with a pump 15.

To operate the device for room heating, warm water heated in the primary heat exchanger 10 is lead through the discharge duct 11 and the upper primary side discharge port duct 3-1 to the upper communicating section 7. This warm water is withdrawn through the upper secondary side suction port duct 4-3 and led to the heat exchanger 17 for giving up heat for room heating. The resultant water at a reduced temperature is led through the secondary side lower discharge port duct 3-4 back to the lower communicating section 7′.

To operate the device for room cooling, cold water obtained in the primary heat exchanger 10 is led through the lower primary side discharge port duct 3-2 to the lower communicating section 7′, and this cold water is led through the lower secondary side suction port duct 4-4 to the secondary heat exchanger 17 to absorb heat. The resultant water at an increased temperature is led through the upper secondary side discharge port duct 3-3 to the upper communicating section 7. Water returned to the primary heat exchanger 10 passes through the primary side suction port ducts 4-1 and 4-2. The ratio between the rates of flow through the ducts 4-1 and 4-2 is controlled by the three-way valve 13. The resultant flow at the controlled rate passes through the suction duct 14 to enter the primary heat exchanger 10. The flow rate ratio at this time is controlled by the three-way valve 13, which is operated according to the temperature detected by the temperature sensor 16, so that the temperature of water flowing through the discharge duct 11 is held at a predetermined temperature.

FIG. 4 shows a different embodiment of the heat storage device provided with a piping for air conditioning according to the present invention.

In the Figure, designated at 21 and 21′ are portions of a heat storage trough made of a reinforced concrete or metal. More particularly, the portion 21 is a vertical cylindrical wall, and the portion 21′ is a circular bottom wall closing the lower end of the cylindrical wall. The cylindrical wall is provided on the outer side with a heat insulation layer 22 and on the inner side with a waterproof layer 23. Horizontal perforated discs 9, having a number of holes 8, are disposed near the top and bottom of the heat storage trough 1′ and define a vertically elongate cell 6 between them.

In the heat storage tank 1′, a discharge port duct 24 and suction port duct 26 are open in a space above the above perforated disc 9. A discharge port duct 25 and a suction port duct 27 are open in a space below the lower perforated disc 9. A perforated disc 9 is as shown in FIG. 5, having a number of holes 8 arranged in radially extending rows. The discharge port duct 25 and suction port duct 27 extend through apertures 28 of discs 9.

The suction port ducts 26 and 27 are connected to a three-way valve 13. This valve controls the ratio between the rate of flow of heat transfer medium passing through the suction port duct 26 and the rate of flow of heat transfer medium passing through the suction port duct 27. The three-way valve 13 is controlled by a signal produced from a converter, which converts the output signal of a temperature sensor 16 inserted into the discharge duct into a three-way valve control signal. Designated at 15 is a pump for circulating warm or cold water through a primary heat exchanger 10 for transferring heat generated in a heat source unit such as a freezer or a boiler to a heat circulating medium, and at 17 a secondary heat exchanger such as an air conditioner.

In the operation of this embodiment of the heat storage device for room cooling, cold water obtained from the primary heat exchanger 10 is led to the lower discharge port duct 25 by the valve 28 during operation of the heat exchanger. The cold water is thus discharged into a lower portion of the heat storage tank. When the heat exchanger is stopped, water is switched to the upper discharge port duct 24 by the valve 28 so that it is discharged into an upper portion of the tank.

Meanwhile, cold water in the lower portion of the heat storage tank is led out through the lower suction port duct 27 to be mixed with water withdrawn through the upper suction port duct 26 as it is led through the pump 15 to the secondary heat exchanger 17.

The ratio of the rate between the flow of cold water through the suction port duct 27, and the rate of flow of water through the suction port duct 26, is controlled by the three-way valve 13 according to a signal from a converter, which converts the output signal from the temperature sensor 6, inserted into the cold water suction duct 25, into the valve control signal.

During this operation for room cooling, the perforated discs 9 disposed near the top and bottom of the heat storage tank have an effect of stratifying the flow of water discharged from the discharge port ducts 24 and 25 and also the flow of water withdrawn into the suction port ducts 26 and 27 as water passes through the perforated discs 9. Thus, it is possible to form a constant temperature layer efficiently in the cell which reduces heat loss due to diffusion and mixing of water at different temperatures.

In the operation for room heating, high temperature water from the primary heat exchanger is led through the upper discharge port duct 24 to be discharged into the upper portion of the heat storage tank, while low temperature water in the lower portion of the heat storage trough is led through the lower suction port duct 27, three-way valve 13 and circulating pump 15 to the primary heat exchanger 10. Again in this case, the perforated discs 9 have an effect of stratifying the flow of water discharged and withdrawn, so that a constant temperature layer can be efficiently formed in the cell 6. If the perforated discs 9 were not provided, water in portions of the cell interior near the discharge and suction ports would be agitated and co-mingled by the streams of water discharged from the upper discharge port duct 24 and withdrawn into the lower suction port duct 27. This would have adverse effects on the formation of a constant temperature layer.

As has been shown, with the heat storage tank of the above embodiment, in which the perforated discs are provided near the top and bottom of the tank, the flow of water discharged or withdrawn can be stratifyed as water passes through the cell. Thus, a constant temperature layer can be efficiently formed in the cell for heat storage. This also means that the heat transfer medium in the upper portion of the tank and that in the lower portion can be used in an adequate ratio depending upon the load of room cooling or room heating. Further, in the cooling or heating of heat transfer medium in the primary heat exchanger, the heat efficiency can be improved to obtain saving of energy and level the room cooling or heating loads.

The heat storage tank according to the invention has one or more vertically elongate cells. The sectional shape of the cells may be circular or rectangular or any other desired shape. The ratio of the depth of the tank to the diameter or transversal dimension of the cell is desirably as large as possible. Usually, however, a satisfactory constant temperature layer can be formed in the cell if the ratio is 2 or above. In this case, a sufficient temperature difference can be obtained between the upper and lower portions of the tank.

As aforesaid, it will be understood that the above described embodiments of the invention are for the purpose of illustration only. Additional embodiments, modifications and improvements can be readily anticipated by those skilled in the art based on a reading and study of the present disclosure. Such additional embodiments, modifications and improvements may be fairly presumed to be within the spirit, scope and purview of the invention as defined by the subtended claims.

We claim:

1. A heat storage device comprising: a heat transfer fluid storage tank having an interior wall surface; a vertically elongated cell within said tank having vertical wall means formed to enclose an unobstructed interior chamber, said wall means starting and terminating at its outer periphery; an upper horizontal perforated plate extending and secured about its periphery to said vertical wall means and positioned below the top edge of said tank to provide an upper storage space therebetween; and a lower horizontal perforated plate extending and secured about its periphery to said vertical wall means and positioned above the bottom of said tank to provide a lower storage space therebetween, said upper and lower plates being positioned closer to said tank top edge and said tank bottom respectively than to each other; means to transport heat transfer fluid to and from said upper storage space; means to transport heat transfer fluid to and from said lower storage space; and means to selectively regulate the flow of heat transfer fluid into and out of said upper and lower spaces; a primary heat exchanger; a secondary heat exchanger; conduit means to selectively transport heat transfer fluid from said primary heat exchanger to said upper and lower spaces; conduit means to selectively transport heat transfer fluid from said upper and lower spaces to said primary heat exchanger; conduit means to selectively transport heat transfer fluid from said secondary heat exchanger to said upper and lower spaces; and conduit means to selectively transport heat transfer fluid from said upper and lower spaces to said secondary heat exchanger.

2. The device of claim 1, wherein said tank contains a plurality of vertically elongated cells defined by a plurality of said vertical wall means.

3. The device of claim 1, wherein the depth of said tank is at least double the width of said cell.

4. The device of claim 1, including conduit means to selectively transport heat transfer fluid from said upper and lower spaces to said secondary heat exchanger; and means to transport said heat transfer fluid from said secondary heat exchanger to said primary heat exchanger.

5. The device of claim 4, including heat sensor means to sense the temperature of the heat transfer fluid downstream from said primary fluid exchanger; and means responsive to said heat sensor means adapted to proportion the flow of heat transfer fluid from said upper and lower spaces to said secondary heat exchanger.

6. The device of claim 4, including a first three way valve to interconnect said secondary heat exchanger with said upper and lower conduit means; a second three way valve positioned upstream of said secondary heat exchanger to interconnect conduit means to said secondary heat exchanger and conduit means to the upstream side of said primary heat exchanger; heat sensor means positioned to sense the temperature of heat transfer fluid upstream of said secondary heat exchanger; and means responsive to said heat sensor means adapted to proportion the flow of heat transfer fluid through said second three way valve.

7. The device of claim 1, wherein said primary heat exchanger conduit means are independent of said secondary heat exchanger conduit means.

8. The device of claim 1, including heat sensor means to sense the temperature of the heat transfer fluid downstream from said primary heat exchanger; and means responsive to said heat sensor means adapted to proportion the flow of heat transfer fluid from said upper and lower spaces to said primary heat exchanger.

9. The device of claim 1, wherein said lower space conduit means extend through said perforated plates.

10. The device of claim 1 wherein said upper space conduit means are positioned above said upper perforated plate.

11. The device of claim 1, wherein a three way valve interconnects said primary heat exchanger with said upper and lower conduit means.

12. A heat storage device comprising: a heat transfer fluid storage tank having an interior wall surface; a vertically elongated cell within said tank defined by an upper horizontal perforated plate extending and secured to said interior wall surface and positioned below the top edge of said tank to provide an upper storage space therebetween; and a lower horizontal perforated plate extending and secured to said interior wall surface and positioned above the bottom of said tank to provide a lower storage space therebetween, said upper and lower plates being positioned closer to said tank top edge and said tank bottom respectively than to each other; means to transport heat transfer fluid to and from said upper storage space; means to transport heat transfer fluid to and from said lower storage space; and means to selectively regulate the flow of heat transfer fluid into and out of said upper and lower spaces; a primary heat exchanger; a secondary heat exchanger; conduit means to selectively transport heat transfer fluid from said primary heat exchanger to said upper and lower spaces; conduit means to selectively transport heat transfer fluid from said upper and lower spaces to said primary heat exchanger; conduit means to selectively transport heat transfer fluid from said secondary heat exchanger to said upper and lower spaces; and conduit means to selectively transport heat transfer fluid from said upper and lower spaces to said secondary heat exchanger; heat sensor means to sense the temperature of the heat transfer fluid downstream from said primary fluid exchanger; and means responsive to said heat sensor means adapted to proportion the flow of heat transfer fluid from said upper and lower spaces to said secondary heat exchanger.

* * * * *